United States Patent [19]

Tobias

[11] 4,131,349

[45] Dec. 26, 1978

[54] LOW COST SENSITOMETER WHICH PROVIDES HIGHLY ACCURATE READINGS

[76] Inventor: Philip E. Tobias, 1872 Watson Rd., Abington, Pa. 19001

[21] Appl. No.: 822,724

[22] Filed: Aug. 8, 1977

[51] Int. Cl.² ............................................. G03B 41/00
[52] U.S. Cl. ............................................................ 354/20
[58] Field of Search .................... 354/20; 355/38, 68, 355/36, 71, 83; 356/46–50, 201, 202, 203, 78, 80; 350/318; 96/38.4

[56] References Cited

U.S. PATENT DOCUMENTS

| | | | |
|---|---|---|---|
| 1,832,294 | 11/1931 | Gent | 354/20 |
| 1,883,884 | 10/1932 | Doran | 354/20 |
| 3,002,425 | 10/1961 | Biedermann et al. | 355/38 |
| 3,522,288 | 1/1971 | Corley | 354/20 X |

*Primary Examiner*—L. T. Hix
*Assistant Examiner*—William B. Perkey
*Attorney, Agent, or Firm*—William E. Cleaver

[57] ABSTRACT

The present sensitometer has its light source energized, through a constant voltage transformer and is initially energized while being covered by a rotating sector shutter which does not permit the light source to send light to the material whose light sensitivity is being measured, until the light source is stabilized. The shape of the sector shutter determines how long the light source is covered to effect light and power stabilization. In addition, the present sensitometer provides a means to filter light from the light source as needed. In addition, the present sensitometer has a top piece which prevents damage to the graded gray scale means but permits ready availability to the light.

1 Claim, 4 Drawing Figures

LOW COST SENSITOMETER WHICH PROVIDES HIGHLY ACCURATE READINGS

BACKGROUND

A sensitometer is a device which is employed to subject photosensitive material to a graded exposure of light; i.e., the light is passed through a standard means which incrementally attenuates the light in accordance with a predetermined pattern. The light is transmitted through the graded exposure means onto a film or some other form of photosensitive material. The amount of light which passes through the graded exposure means is considered to be known and therefore the sensitivity response is predictable provided the photosensitive material meets some predetermined or standard criteria, or provided the photo developing process conforms to some predetermined or standard criteria. In a manufacturing process, the manufacturer of the film or photosensitive material will know what kind of exposure-density (H vs D) relationship is desired for his product. If a sample of the product is exposed to a graded source of light as provided by a sensitometer, data can be gathered which is indicative of the response of the sample to the graded exposure. This data can be plotted or processed to provide an H vs. D curve. If the sample of the product does not respond to the graded exposure of light so that the resultant H vs. D curve approximates the desired curve (within some predetermined limits) then the processing or fabrication of the product is corrected or dealt with in some compensating way (the product could even be scrapped).

It is stated above that in the prior art the quantity of light passing through the graded exposure means was considered to be known. Unfortunately, in the prior art, the quantity of light passing through the graded exposure means was not always consistent and, therefore, was not always known. The foregoing is true for two reasons. First, the light bulb would take more or less time to beat up to its stabilized condition depending upon whether or not the lamp was cool or hot from some prior use. In addition, the transformer which generally was employed to provide power to the lamp would take several cycles of its 60 Hertz frequency to provide an output voltage which had stabilized. Accordingly it was found that the light passing through a graded exposure means varied because of the lack of light and power stabilization. In some embodiments of sensitometers, complex and expensive shutters and voltage stabilization devices are employed to provide consistent characteristics of light source. In the present invention a relatively simple and low cost means is provided to enable the light source to be stabilized with respect to both its power input and element heating.

SUMMARY

The present sensitometer consists of a box-like structure, the top of which comprises a glass cover. On the bottom surface of the glass cover there is a window area effected, or defined, and a graded gray scale means is disposed in said window area. In the box or housing there is located a lamp disposed beneath the window area. In addition, within the housing there is located a motor which is gear chain-linked to a shaft upon which there is mounted a sector shutter; i.e., a rotating flat member which is formed as a section of a circle. The motor and sector shutter are disposed relative to said lamp so that when the motor is not energized the sector shutter is located between said lamp and said window area and when said motor is energized, the section shutter rotates and permits light to pass from said lamp to said window area at the end of said sector shutter's rotational excursion. In addition, the present sensitometer has a removable filter means which enables a plurality of different filters to be disposed between said lamp and said window. The objects and features of the present invention will be better understood in view of the description below taken in conjunction with the drawings wherein:

Figure 2:
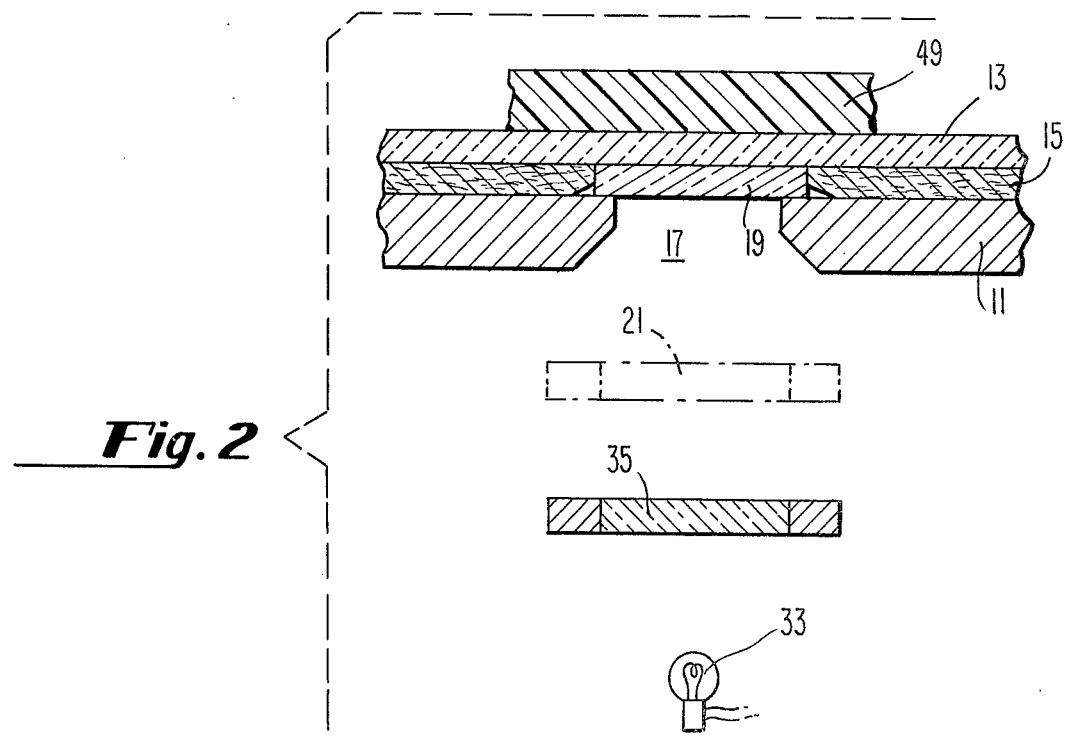
FIG. 2 is a pictorial schematic depicting the window area of the cover glass and the graded gray scale member.
Figure 3:
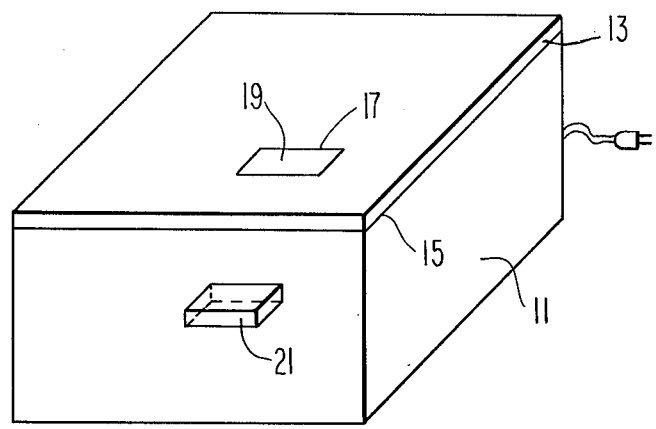
FIG. 3 is a pictorial schematic depicting the removable filter means.

Consider FIG. 3 which is shown primarily to illustrate the location of the removable filter but which in fact also depicts the box-like structure within which the motor, sector shutter, diffuser, lamp and circuitry are housed. In FIG. 3 there is shown the optically opaque housing 11 at the top of which there is disposed a cover glass means 13. Beneath the cover glass means 13 and secured to both the top of the housing 11 and the cover glass means is a layer of double faced adhesive material 15 which can be best seen in FIG. 2. The top of the housing 11 has an aperture 17 cut therein and a graded gray scale device 19 (also shown in FIG. 2) is disposed to lie over the aperture 17, framed by the double faced adhesive material, and under the cover glass member 13. The arrangement of the cover glass over the graded gray scale device 19 provides for protection of the scale, wear resistance and a planar surface onto which samples being exposed to the light can be located. In the preferred embodiment the cover glass is about 0.008 inches thick, the double faced adhesive material is about 0.012 inches thick and the graded gray scale is about 0.009 inches thick. The double faced adhesive material can be any such but preferably should approximate the same thickness as or preferably slightly thicker than, the graded gray scale device. In the preferred embodiment, the graded gray scale device is manufactured by Eastman Kodak Company, but could be any other suitable graded gray scale.

While the removable filter 21 is shown in FIG. 3, we will discuss more fully hereinafter when its role becomes more meaningful.

Figure 1:
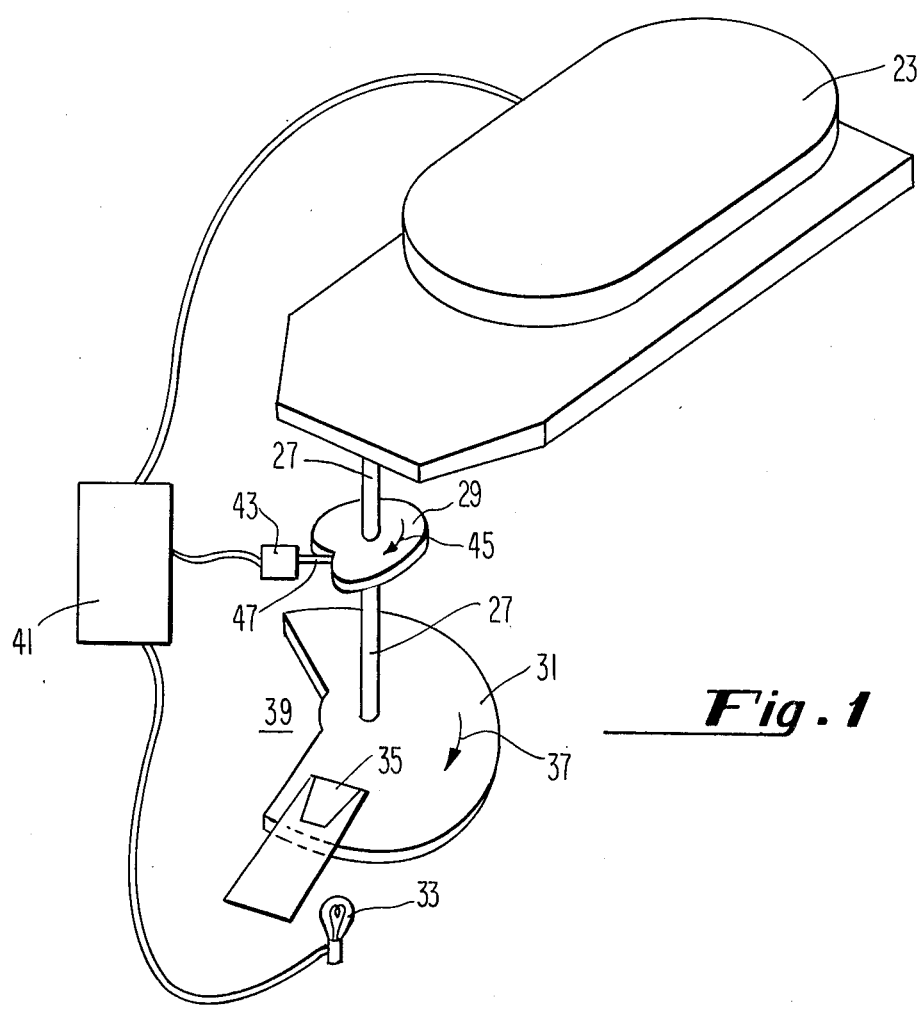
FIG. 1 is a pictorial schematic depicting the drive motor, the sector shutter, the lamp and diffuser.

Consider FIG. 1. In FIG. 1, there is shown a motor 23 mounted on a motor support 25. In the preferred embodiment, motor 23 is a Synchronous motor. Rotatably connected to the motor drive is a shaft 27. On the shaft 27 there is mounted a cam 29 and a sector shutter 31. It should be noted that the sector shutter 31 is formed in the shape of a section of a circle.

It can be readily determined by observation of FIG. 1 that if the sector shutter 31 is at rest, as shown in FIG. 1, no light passes from the lamp 33 through the diffuser 35. It is equally apparent by observation of FIG. 1 that if the sector shutter 31 is driven in the direction of arrow 37 that as the excursion of the shutter approaches its completion, the cut-away part 39 of the shutter 31 will pass between the lamp 33 and the diffuser 35, thereby permitting light to pass through the diffuser 35. In order to effect a rotational single cycle; i.e., a single excursion of the sector shutter 31, there is provided an electrical circuit in housing 41, the details of which will be described hereinafter in a discussion of FIG. 4.

The circuitry employed does use a microswitch 43 shown in FIG. 1. As will be described more fully hereinafter, when the start button is depressed, the motor 23 is energized and the shaft 27 is driven in a counterclockwise direction. Accordingly, cam 29 will be driven in the direction of arrow 45 which will close microswitch 43. As will become apparent in our discussion of the circuit of FIG. 4, microswitch 43 is part of a "hold circuit" and therefore as long as cam 29 keeps the microswitch 43 closed, the motor 23 will continue to be energized. It is apparent from FIG. 1 that when the cam 29 rotates to a position, where the plunger 47 drops into the notch, the microswitch 43 will open and motor 23 will no longer be energized. Accordingly, when the start button is depressed, momentarily, the sector shutter makes a single excursion to expose the light from lamp 39 through the diffuser 41 for a finite period of time defined by the shape of the cut-away section 39 and the speed of the motor.

In FIG. 2, we further see the relation between the lamp 33, the diffuser 35 and the graded gray scale 19. While in our previous discussion of FIG. 1, we talked about the light passing from the lamp 33 through the diffuser 35, it is important to note that said light ultimately passes through the filter 21 if used and through the graded gray scale member 19, through the cover glass 13 to the sample 49 of the photosensitive material being analyzed or monitored.

In FIG. 2, there is shown in phantom a removable filter 21. It is often desirable to use a filter between the diffuser and the graded gray scale.

Figure 4:
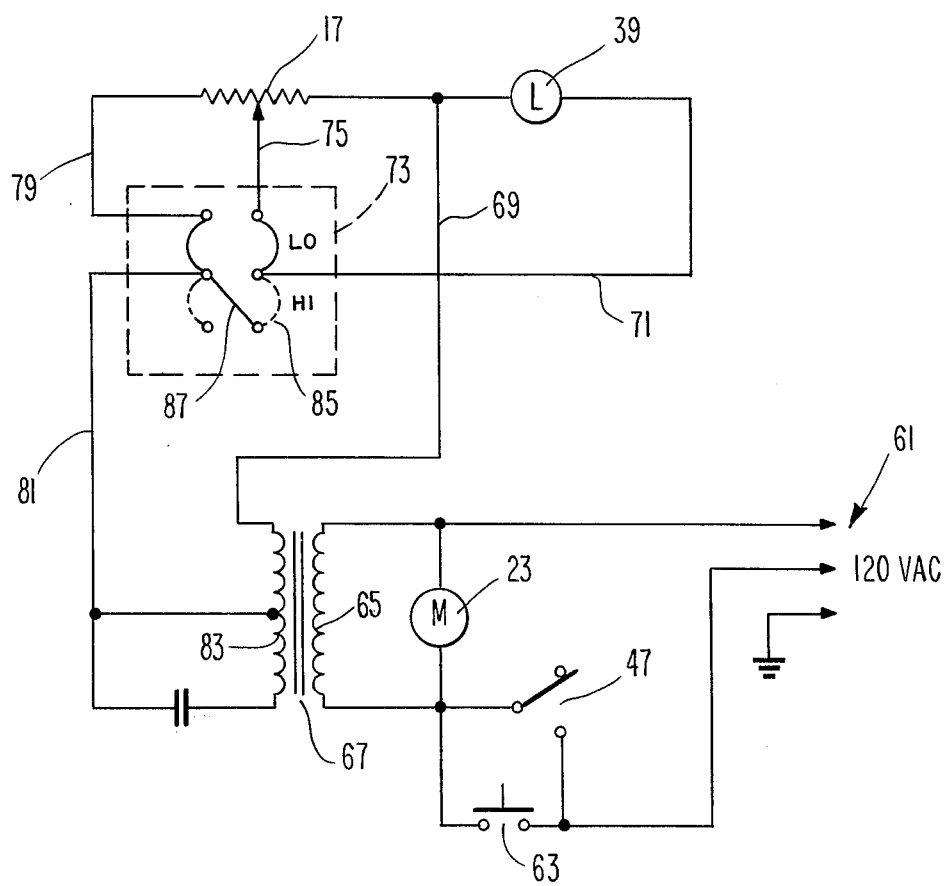
FIG. 4 is a wiring schematic of the sensitometer.

Consider FIG. 4. In FIG. 4 there is a power source 61 which would be effected by connecting a line plug to an outlet. As can be determined in FIG. 4, although power is available to the circuit there is no energization of the circuitry until the start button 63 is depressed. When the start button 63 is depressed, voltage is supplied across the motor 23 and across the transformer 67. The transformer 67 in the preferred embodiment is a resonant type constant voltage transformer.

When voltage is applied across the motor 23, the motor rotates, thereby closing the microswitch 43 (as described above). As can be seen in FIG. 4, when the microswitch 43 closes there will be voltage through the microswitch to the motor and transformer so that even though the start button is released (and for as long as the switch 43 is closed) the motor will rotate and power will be supplied to transformer 67. We learned earlier that the motor rotates for only one excursion of the sector shutter if the start button is closed only momentarily.

While transformer 67 is energized there will be current from the secondary winding 83 along line 69, through lamp 33, to the right and down along line 71, to the Hi-Lo switch 73. The Hi-Lo switch 73 is shown connected in its Lo position. Accordingly as shown, current will pass through the Lo switch connection to line 75, to the left from potentiometer 77, along line 79, through the second side of the Lo switch 73, to the right along line 81 to the secondary winding 83 center tap of transformer 67. In the arrangement of the circuit shown in FIG. 4, lamp 33 will be lighted in a low voltage mode with the intensity controlled by the potentiometer 77.

As is further apparent from FIG. 4, when switch 73 is thrown to the Hi side, as shown in phantom, the potentiometer 77 will be shunted out by having the current pass through connections 85 and 87. Accordingly it is possible to light the lamp 33 in a high voltage mode.

Let us now consider the operation of the device and its advantages. It takes some finite time for lamp 33 to have its element heat up to a stabilized light output, and that time will vary depending upon whether or not the lamp is cold or hot respectively from previous non use or use. It also takes transformer 67 a finite period to stabilize and provide a constant voltage. The principal advantage of the present device is the provision of a means to allow those finite times to elapse and expose a sample being monitored to only a stabilized light source and a stabilized voltage source.

As can be gleaned from a consideration of the structure of FIG. 1 and the circuitry of FIG. 4, when the motor is de-energized, at its "home" position, the sector shutter 31 is located between the lamp 33 and the sample to be subjected to the light. Hence when the start button 63 is depressed, even though lamp 33 is lighted, no light is transmitted through the diffuser 35, graded gray scale 19, cover glass 13 to the sample 49. However, at the depression of the start button, the sector shutter begins to rotate and by the time that the cut-away section 39 is over the lamp 33, both the lamp 33 and the transformer 67 have stabilized.

It is well appreciated by those skilled in the photosensitive material art that when making a measurement employing a light source, there can be a great deal of erroneous data generated if the light source does not provide a consistent or stabilized output. The present sensitometer provides such a stabilized output of light.

In addition, the present sensitometer provides a relatively low-cost device by mounting the cover glass on double-faced adhesive and a flexible device by providing for a removable filter means. The removable filter means 21 merely slides into and out of the housing on a pair of tracks mounted in the housing.

I claim:

1. A light sensitometer which is employed to permit photosensitive material to be subjected to an accurately determined exposure of light comprising in combination: housing means having a top piece, said top piece formed so that at least a portion thereof is a transparent section; graded gray scale means formed to permit predetermined amounts of light to pass therethrough, said graded gray scale means disposed to be in the path of any light passing through said transparent section; light source means formed to be alternatively energized and deenergized and disposed within said housing means so that light therefrom can pass through both said transparent section and said graded gray scale means; sector shutter means mounted on a shaft and formed to be capable of making a complete rotation and further formed and disposed with respect to said light source and said transparent section so that when said sector shutter is at rest and during the initial part of said complete rotation from rest, said sector shutter will block light from passing from said light source to said transparent section and further formed so that during a later portion of said complete rotation said sector shutter will permit light to pass from said light source to said transparent section, whereby during a complete rotation of said sector shutter said light source will be energized for a sufficiently long period so that its power input and its light output will be stabilized before light is permitted to pass to said transparent section; cam means mounted on said shaft; motor means coupled to said shaft to cause said shaft to rotate when said motor is energized; electrical circuitry means coupled to said cam means, said motor means and said light source whereby when said light source is energized said motor means will be energized to cause said sector shutter and said cam means to be rotated and whereby said cam means will cause said circuitry means to automatically deenergize said motor means and said light source at a predetermined time.

* * * * *